United States Patent
Shibata et al.

[11] Patent Number: 5,187,720
[45] Date of Patent: Feb. 16, 1993

[54] SYNCHRONOUS SERIAL COMMUNICATION CIRCUIT

[75] Inventors: Koichi Shibata; Toshitaka Fukushima; Hiroyuki Watanabe; Shinichiro Miyahara; Osamu Imagawa, all of Tokyo, Japan

[73] Assignee: Seiko Instruments Inc., Japan

[21] Appl. No.: 628,585

[22] Filed: Dec. 17, 1990

[30] Foreign Application Priority Data

Dec. 20, 1989 [JP] Japan .................................. 1-331811

[51] Int. Cl.[5] ........................................... H04L 27/00
[52] U.S. Cl. ...................................... 375/35; 375/55; 361/245; 178/63 F
[58] Field of Search .......................... 375/55, 35, 9, 52; 379/55; 455/41; 361/245, 246; 178/63 F

[56] References Cited

U.S. PATENT DOCUMENTS 2,921,255  1/1960  Norton .............................. 361/246 X

*Primary Examiner*—Curtis Kuntz
*Assistant Examiner*—Tesfaldet Bocure
*Attorney, Agent, or Firm*—Bruce L. Adams; Van C. Wilks

[57] ABSTRACT

The synchronous serial communication circuit transmits and receives data, which is added flag patterns for recognizing the coil winding direction at the first and last of data block, by the electromagnetic induction system using a pair of coils. So, the circuit provides modulation and demodulation circuits acting at the clock of twice of the transfer speed and a flag check circuit for recognizing the inversion of the coil winding direction by judging a state of the flag patterns included in the received data. The transmitted data is converted into the biphase signal by the modulation circuit and is transmitted by driving the coil using the biphase signal. The signal received by the coil is converted into the received data by the demodulation circuit. When the winding directions of coils does not agree, the flag check circuit recognizes the inversion of the coil winding direction and the received data is inverted by the demodulation circuit.

3 Claims, 4 Drawing Sheets

SYNCHRONOUS SERIAL COMMUNICATION CIRCUIT

BACKGROUND OF THE INVENTION

1. Field of the Invention

The present invention relates to a synchronous type serial communication circuit for carrying out no contact point communication by an electromagnetic induction system and employing a portable information apparatus.

2. Description of the Prior Art

For the data transfer by use of the electromagnetic induction system in conventional portable information apparatuses, there is non synchronizing communication by use of a start-stop synchronizing system, or synchronizing communication for separately transferring the clock and data by providing a plural number of coils. In the case of communication by the start-stop synchronizing system a control clock of at least 8 or 16 times the transfer speed becomes necessary so that the system becomes difficult to be realized. In the case of the synchronizing communication utilizing a plural number of coils, a plural number of coils becomes necessary, and it is necessary to make the winding direction of the coils in the same direction.

SUMMARY OF THE INVENTION

An object of the present invention is to provide a synchronous serial communication circuit which carries out the synchronizing communication in the biphase system by the use of a pair of coils.

Another object of the present invention is to
a synchronous serial communication circuit which carries out the synchronizing communication irrespective the winding direction of the coil.

To realize the above objects, the synchronous serial communication circuit of the present invention provides a modulation circuit for generating biphase signals based on transmitted data, a coil, a transmission and reception circuit for transmitting the data by driving the coil in correspondence to the biphase signals and for receiving data via the coil, a demodulation circuit for demodulating the received data, and a judgment circuit for judging whether the winding direction of the coil agrees with that of coil disposed in other apparatus communicating with it. Further, the present invention makes the tuning frequency of the coil twice that of the transfer speed of data.

DESCRIPTION OF THE PREFERRED EMBODIMENTS

Now the present invention will be explained in detail with reference to the embodiments thereof shown in the attached drawings.

The serial data communication according to the present invention is carried out by biphase modulation and is based on the restriction of the following three points.

1. The data are added with flags of more than two times at the first of the transfer data block, and with a flag of one time at the last. The flag is made as [01111110]

2. In the data other than the flag, [0] is added after five continued [1].

3. The transfer speed is made as the half of the tuning frequency of a coil.

Figure 1:
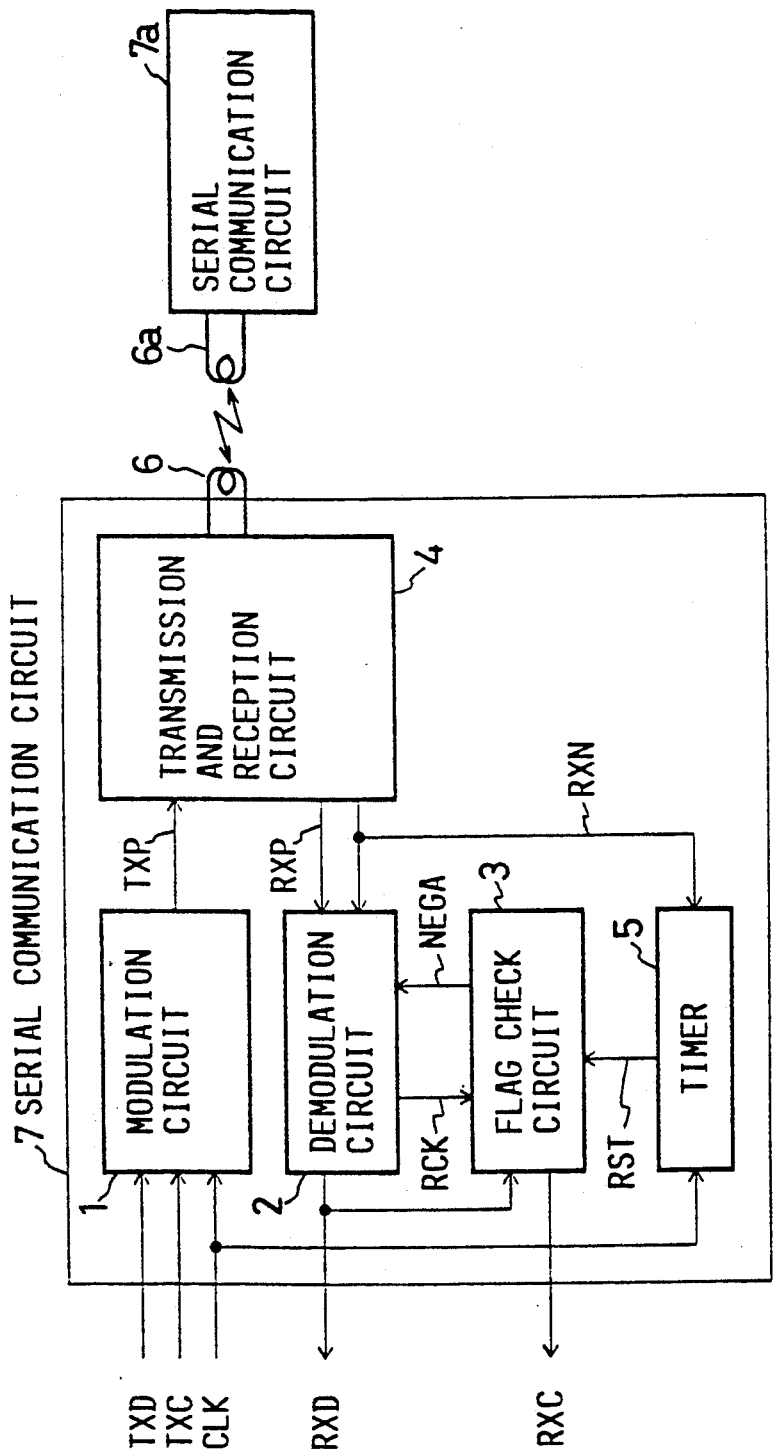
FIG. 1 is a block diagram of a serial communication circuit of the present invention.

FIG. 1 is a block diagram of a serial communication circuit of the present invention.

A serial communication circuit 7 is constituted of a modulation circuit 1, a demodulation circuit 2, a flag check circuit 3, a transmission and reception circuit 4, and a timer 5. A portable information apparatus having the serial communication circuit 7 can communicate with other apparatus having a serial communication circuit 7a, which has the same constitution as that of the circuit 7, via a pair of coils 6, 6a.

At first, in the transmitting side, transmitted data TXD applied with the flag and the [0] insertion is supplied to the modulation circuit 1 together with a transmission clock TXC and a tuning clock CLK of twice the frequency of TXC. Biphase signals TXP formed with the TXC, TXD and CLK by the modulation circuit 1 are supplied to the transmission and reception circuit 4. The transmission and reception circuit 4 drives the coil 6 in correspondence to TXP and transmits data.

On the other hand, in the receiving side, the transmission and reception circuit 4 receives signals via the coil 6 and divides the received signals into RXP and RXN by a comparator. The signals of RXP and RXN are supplied to the demodulation circuit 2. The demodulation circuit 2 generates received data RXD and received clock RCK in correspondence with the signals of RXP and RXN. The RXD and the RCK are supplied to the flag check circuit 3. The flag check circuit 3 eliminates [0] behind the five continued [1] in RXD and recognizes the flag pattern included in RXD so that it supplies NEGA signals indicating that the coils 6, 6a are inverse winding directions to the demodulation circuit 2 and generates a received data clock RXC which eliminates the clock at the time of [0] after the five continued [1]. The timer 5 is counted by the CLK, is reset by the RXN, and supplies the count up signal RST to the flag check circuit 3.

Figure 2:
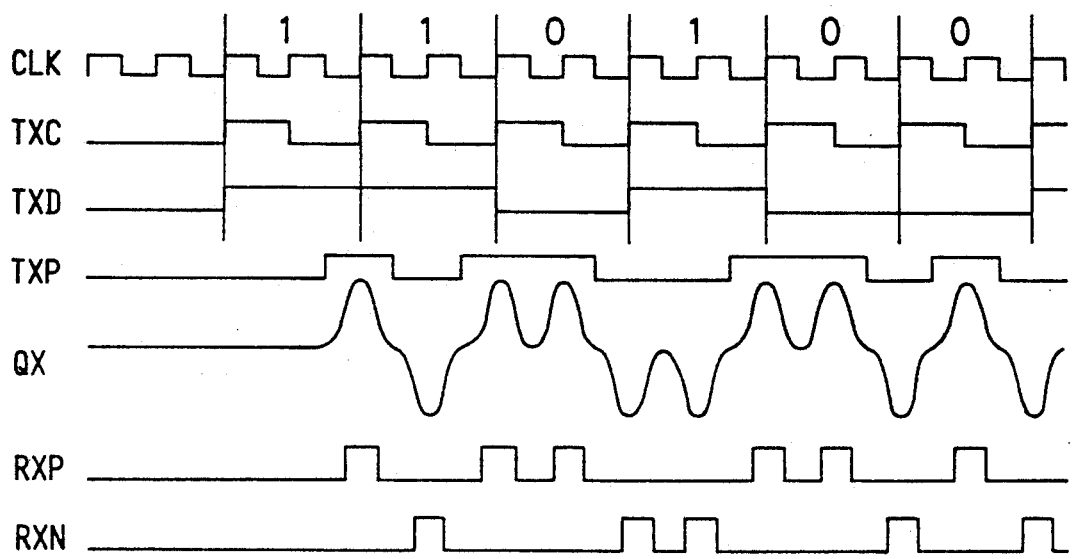
FIG. 2 is a group of waveform diagrams of assistance in explaining the operation of the circuit shown in FIG. 1.
Figure 3:
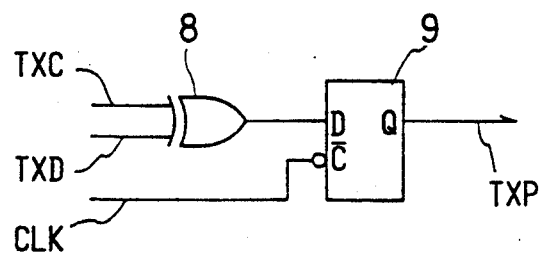
FIG. 3 diagrammatically illustrates an embodiment of the modulation circuit shown in FIG. 1.

FIG. 2 is a group of waveform diagrams of assistance in explaining the operation of the circuit shown in FIG. 1. FIG. 3 diagrammatically illustrates an embodiment of the modulation circuit shown in FIG. 1. In this case, the transmitted data TXD is data having [110100], the tuning clock CLK is equal to a tuning frequency of the coil 6, and the transmission clock TXC defines the transfer speed of data and is a half frequency of CLK. The TXC and the TXD are input into a data input terminal of a D-FF 9 via an EXOR gate 8. The D-FF 9 outputs the biphase signal TXP at the time of the falling edge of CLD. The signal TXP is utilized as a driving signal of the coil 6. A signal is a waveform representing the received signal received by the coil. The signals RXP and RXN are the signals obtained by shaping the signal QX by the comparator.

Figure 4:
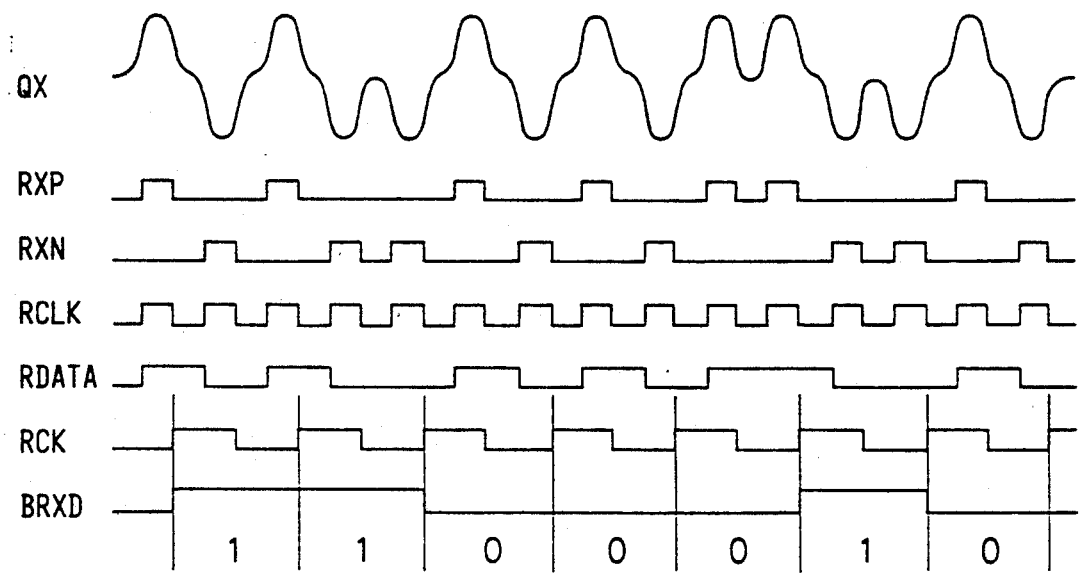
FIG. 4 is a group of waveform diagrams of assistance in explaining the receiving operation of the circuit shown in FIG. 1.
Figure 5:
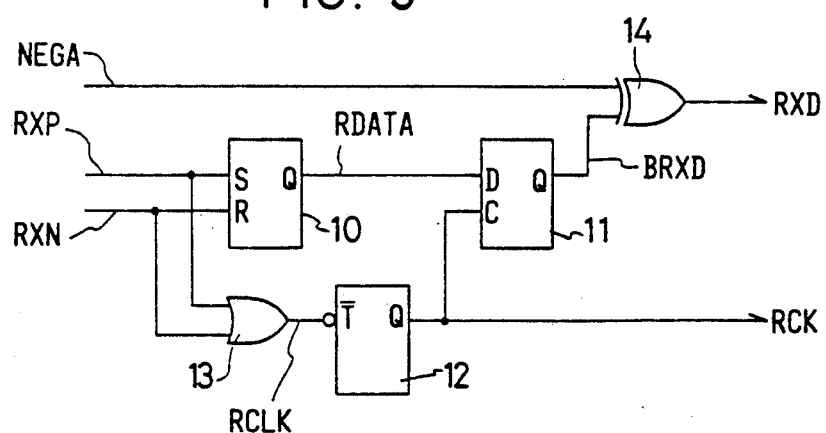
FIG. 5 diagrammatically illustrates an embodiment of the demodulation circuit shown in FIG. 1.

FIG. 4 is a group of waveform diagrams of assistance in explaining the receiving operation of the circuit shown in FIG. 1. FIG. 5 diagrammatically illustrates an embodiment of the demodulation circuit shown in FIG. 1. In this case, the received signal is QX having data of [1100010]. The signals RXP and the RXN are obtained by shaping the QX when it is above and below a positive and negative threshold and are input into a set terminal and a reset terminal of a RS-FF 10 and the RS-FF 10 outputs RDATA. Also, the signals RXP and RXN are supplied to an OR gate 13 and are converted into a signal RCLK. Further, the reception clock RCK is formed by frequency dividing with a T-FF 12. A D-FF 11 outputs a signal BRXD by getting RDATA at the time of the rising edge of RCK. The signal BRXD is supplied to an EXOR gate 14 with the NEGA signal so that the received data RXD having data of [1100010] is obtained.

Figure 6:
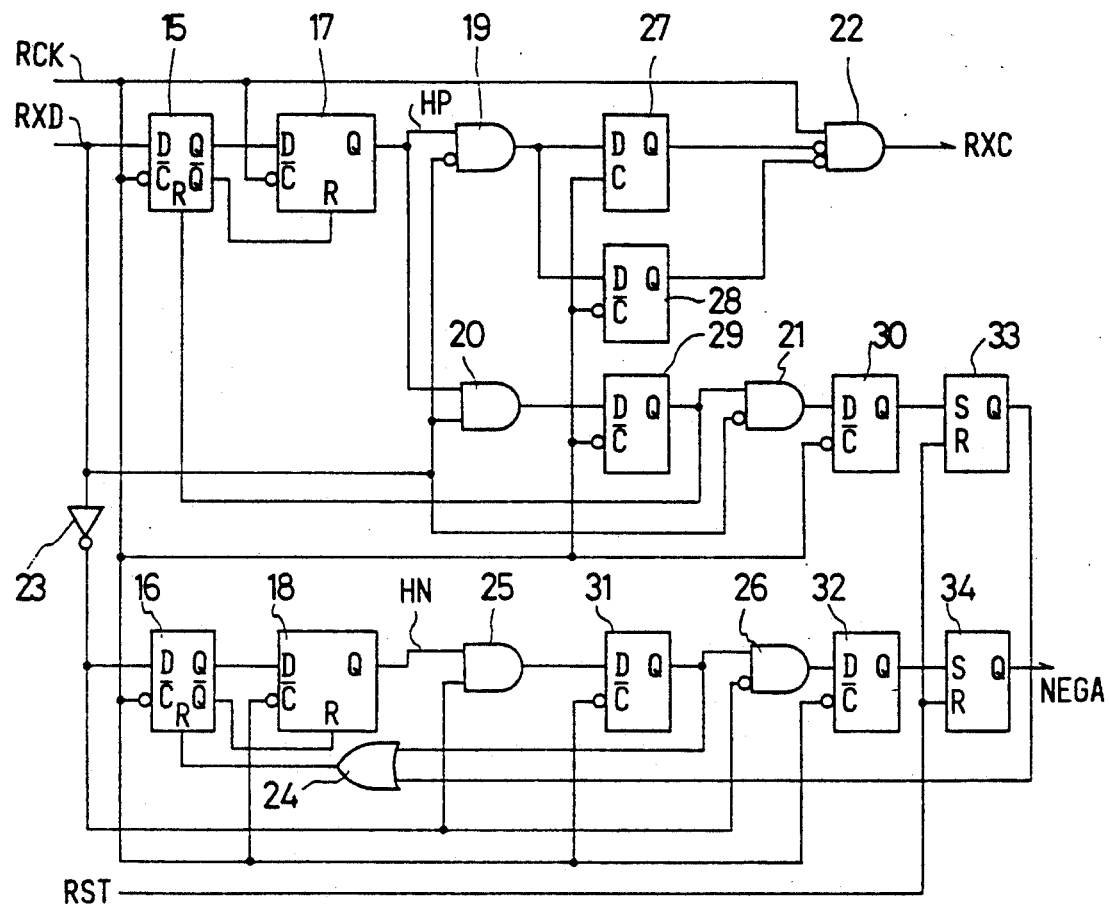
FIG. 6 diagrammatically illustrates an embodiment of the flag check circuit shown in FIG. 1.

FIG. 6 diagrammatically illustrates an embodiment of the flag check circuit shown in FIG. 1. The received data RXD is taken in a D-FF 15 at the time of the falling edge of RCK. A 4 stage shift register 17 takes in the output of the D-FF 15 at the time of the falling edge of RCK and outputs the HP signal. Also the 4 stage shift register 15 is reset by the inverse output of the D-FF 15. The HP signal is the signal having five continued [1], is supplied to DLT 27 and D-FFs 28, 29 via gates 19, 20 and is taken in them in correspondence to RCK. The outputs of the DLT 27 and the D-FF 28 and RCK are supplied to a gate 22 so that received data clock RXC is formed. The output of the D-FF 29 is supplied to the reset terminal of the D-FF 15, and is supplied to a gate 21 with RXD. A D-FF 30 takes in the output of the gate 21 at the time of the falling edge of RCK. The output of the D-FF 30 is supplied to a set terminal of a RS-FF 33.

Further, the received data RXD is supplied to a D-FF 16 and is taken in the D-FF 16 at the time of the falling edge of RCK. 4 stage shift register 18 takes in the output of the D-FF 16 at the time of the falling edge of RCK and outputs the HN signal. The 4 stage shift register 18 is reset by the inverse output of the D-FF 16. The HN signal is the signal having five continued [0] and is supplied to a gate 25 with the output of the gate 23. A D-FF 31 takes in the output of the gate 25 at the time of the falling edge of RCK. The output of the D-FF 31 is supplied to a gate 26 with the output of the gate 23. A D-FF 32 takes in the output of the gate 26 at the time of the falling edge of the RCK. The output of the D-FF 32 is supplied to the set terminal of a RS-FF 34 and is converted to the NEGA signal of the winding inverse signal. The count up signal RST of the timer 5 is connected to the reset terminals of the RS-FFs 33, 34. The outputs of the RS-FF 33 and the D-FF 31 are connected to the reset terminal of the D-FF 16 via a gate 24.

Here, an explanation will be given on the recognition of the flag.

Five continued [1] in the received data RXD is recognized by the D-FF 15 and the 4 stage shift register 17. The 4 stage shift register 17 is reset when it is supplied with one [0] in RXD supplied in synchronization with RCK so that the signal HP becomes [1] at the time of the timing only when the five continued [1] row has been received. When the data signal next to the five continued [1] is [1], the output of the gate 20 becomes [1]. At this time, the output of the D-FF 29 becomes [1] at the time of the falling edge of RCK so that the D-FF 15 and the 4 stage shift register 17 are reset. When the data signal next to the five continued [1] is [0], the output of the gate 21 becomes [1]. At this time, the output of the D-FF 30 becomes [1] at the time of the falling edge of RCK so that the RS-DD 33 is set as to show the fact that the flag has been recognized.

In the case when the winding direction of the coil is inverted the recognition of the flag may be carried out on [10000001]. In the circuit formed with the D-FF 16, the 4 stage shift register 18, the gates 24, 25, 26, the D-FF 32, and the RS F/F 34, the same performance as that described above is carried out. The NEGA signal for showing the inversion of the coil winding direction is connected to the EXOR gate 14 of the demodulation circuit 2. In the case of the state of the winding direction inversion of the coil when the fag is once recognized, the received data RXD itself is inverted.

Next, an explanation will be given on the elimination of data [0]behind the five continued [1].

At the time when the signal next to the five continued ]1] is [0], the output of the gate 19 becomes [1]. At this time, the output of the D-FF 28 becomes [1] at the time of the falling edge of RCK, and the output of the DLT 27 is latched. By the outputs of the DLT 27 and the D-FF 28, RCK is negated at the gate 22, and becomes a signal in which RXC has been elongated for one clock part.

Figure 7:
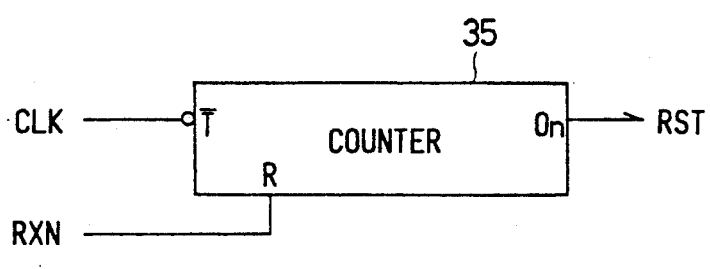
FIG. 7 diagrammatically illustrates an embodiment of the timer shown in FIG. 1.

FIG. 7 is a practical circuit diagram of the timer 5. The counter 35 counted by the clock CLK is a counter which is reset by RXN, and when counted up, overflow signal RST becomes [1]. That is, this timer acts due to the fact that the received signal becomes broken for a while.

According to the present invention, irrespective of the winding direction of the coil, the synchronous system communication has become possible by the use of a pair of coils.

Also, the communication has become possible at the maximum frequency twice of the transfer speed, and the high speed communication in a low expense current has become possible.

The synchronous serial communication circuit of the present invention can be utilized in the portable information apparatus. The present invention can provide the portable information apparatus which carries out the synchronous serial communication by the use of a pair of coils and irrespective of the winding direction of coil.

What is claimed is:

1. An apparatus for synchronous data communication by electromagnetic induction means using a pair of coils and a synchronous serial communication circuit, the synchronous serial communication circuit comprising:
   a modulation circuit receptive of data to be transmitted via one coil, a transmission clock signal and a synchronous clock signal for generating a biphase signal having flag patterns added before and after the data to enable recognition of the winding direction of the one coil;
   a transmission and reception circuit for transmitting the data by driving the one coil with the biphase signal, and for receiving transmitted data with the other coil;
   a demodulation circuit for demodulating the transmitted data received by the transmission and reception circuit; and a flag recognition circuit receptive of the demodulated flag patterns received with the transmitted data for determining the winding direction of the other coil.

2. An apparatus according to claim 1, wherein the frequency of the synchronous clock signal is twice that of the transmission clock signal.

3. An apparatus for synchronous serial data communication, comprising:
one coil having a winding direction;
transmitting and receiving means coactive with the one coil for transmitting an output signal to a coil by electromagnetic induction and for receiving an input signal from another coil having a winding direction by electromagnetic induction;
means for generating a synchronizing clock signal;
modulating means receptive of the synchronizing clock signal and data to be transmitted for generating the output signal and applying same to the transmitting and receiving means, the modulating means having means for adding flag bits before and after the data to be transmitted to indicate the winding direction of the one coil;
demodulating means receptive of the input signal from the transmitting and receiving means for demodulating data and flag bits transmitted therewith; and
means receptive of the flag bits from the demodulating means for determining the winding direction of said another coil.

* * * * *